United States Patent [19]

Fourie

[11] Patent Number: 4,671,576
[45] Date of Patent: Jun. 9, 1987

[54] DECELERATION CONTROL SYSTEM

[75] Inventor: Eugene Fourie, Pretoria, South Africa

[73] Assignee: WABCO Westinghouse (Railway Brake) (Pty.) Ltd., Johannesburg, South Africa

[21] Appl. No.: 835,393

[22] Filed: Mar. 3, 1986

[30] Foreign Application Priority Data

Mar. 6, 1985 [ZA] South Africa ................ 85/1692

[51] Int. Cl.[4] ............................................. B60T 13/74
[52] U.S. Cl. ........................................ 303/3; 188/156; 303/15; 303/20; 303/101
[58] Field of Search ................. 303/3, 15–17, 303/20, 64, 93, 94, 95, 100, 101, 102, 103, 107–110, 22 R, 22 A; 188/156–165; 364/424, 426

[56] References Cited

U.S. PATENT DOCUMENTS

| | | | |
|---|---|---|---|
| 2,160,209 | 5/1939 | Canetta | 303/101 |
| 3,398,994 | 8/1968 | Smith | 303/20 X |
| 3,560,054 | 2/1971 | Sarbach | 303/20 |
| 4,056,286 | 11/1977 | Burkett | 303/3 X |
| 4,598,953 | 7/1986 | Wood et al. | 303/15 X |

Primary Examiner—Douglas C. Butler
Attorney, Agent, or Firm—G. J. Falce

[57] ABSTRACT

A deceleration control system in which an operator's brake valve device provides corresponding pneumatic and electric brake demand signals in accordance with a selected handle position, the pneumatic brake demand signal controlling a blending valve device to establish the maximum level of friction braking, while the electric brake demand signal is compared to an actual rate of retardation signal to provide a rate error signal that acts via a transducer of the blending valve to reduce the effective friction braking to the extent that the rate of retardation exceeds the brake demand. The electric brake demand signal is limited in accordance with a speed/adhesion characteristic, while a further circuit slip modulates the brake demand signal.

18 Claims, 6 Drawing Figures

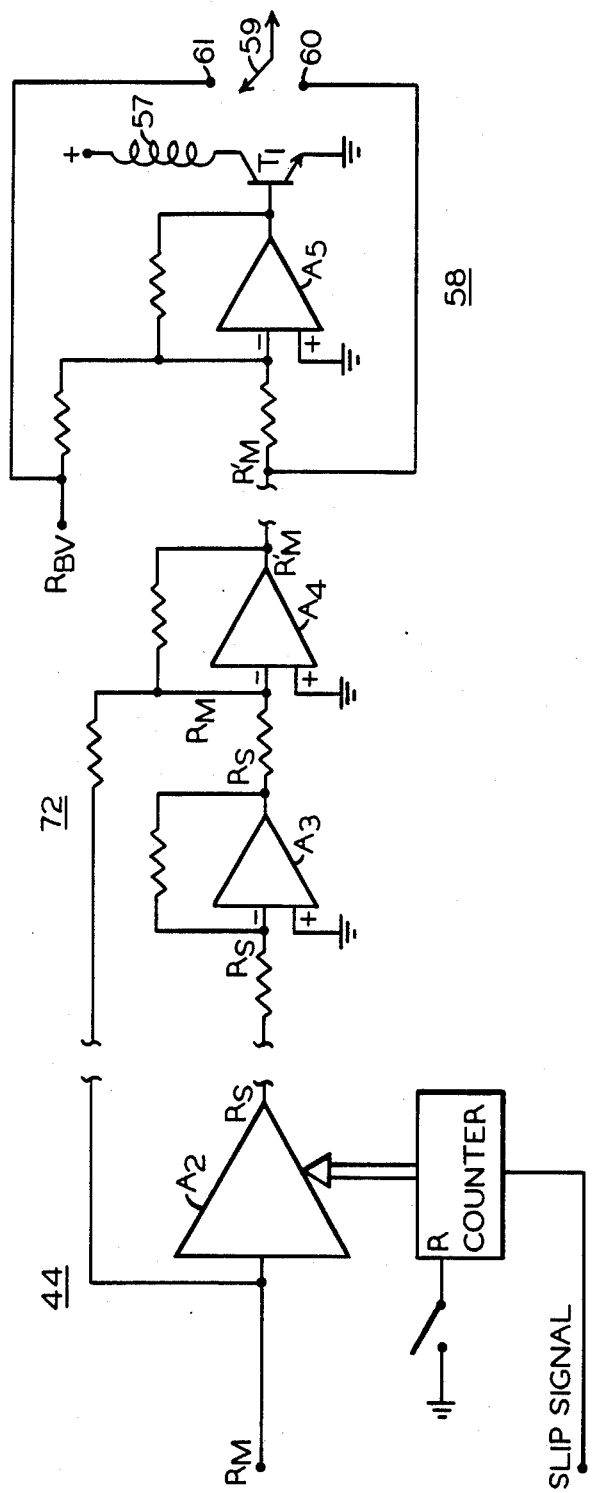

DECELERATION CONTROL SYSTEM

BACKGROUND OF THE INVENTION

With the advent of high speed rail transit systems where transit cars or trains are operated at closely controlled intervals and at increasingly faster speeds, in order to transport large masses of people in the shortest possible time, increasingly greater demands are imposed on the vehicle braking systems. These systems must be able to bring the vehicle to a halt in the shortest practical distance, within closely defined limits, with a high degree of repeatability, and without causing passenger discomfort.

The evolution of brake systems has advanced from open-loop concepts to the more recently implemented closed-loop concepts, wherein either torque feedback or brake cylinder pressure feedback signals are employed to regulate retardation. When further compensated by load-weighing and dynamic/friction brake blending, a brake control system is provided which attempts to constrain the vehicle retardation rate to be a linear and repeatable function of the brake level requested, despite variances in car weight, brake-shoe-to-wheel friction, dynamic brake effectiveness, etc. While the above-mentioned torque or pressure feedback signals are employed to simulate actual rate, these signals fail to consistently provide a true indication of actual braking force, so that even when supplemented with such auxiliary feedback loops, as mentioned above, the retardation rate cannot be controlled accurately.

SUMMARY OF THE INVENTION

It is therefore an object of the present invention to provide an improved deceleration brake control system employing a closed-loop feedback circuit in which the actual vehicle rate of retardation is utilized as the feedback signal.

Another object of the invention is to provide a deceleration control system according to the foregoing objective without incurring interaction between cars of the train.

Another object of the invention is to provide vehicle rate of retardation in accordance with a predetermined maximum adhesion demand.

Another object of the invention is to periodically slip-modulate the maximum adhesion demand by a predetermined percentage in the event a wheel-slide occurs.

Another object of the invention is to permit deceleration at a different maximum level of adhesion than the slip modulated maximum adhesion demand during emergency braking irrespective of an existing wheel-slip condition.

Another object of the invention is to overlap the deceleration control system with a back-up brake control system, such that the brake control can revert from deceleration control to the back-up system in the event a malfunction is detected in the deceleration control system.

Another object of the invention is to achieve friction braking intially in response to a retardation rate demand, and to subsequently back off the friction brake as the electrodynamic brake becomes effective to produce retardation.

Another object of the invention is to provide a rate-error signal according to the difference by which the actual rate of vehicle retardation exceeds the retardation rate demand, and to reduce the friction brake accordingly, until the actual vehicle retardation is reduced to the rate requested, as exemplified by a zero rate error.

Briefly, these objectives are achieved in accordance with the present invention wherein an operator's brake valve device is operated to control pneumatic braking pressure in a conventional manner, and to concurrently establish an analog electrical brake demand signal, the amplitude of which corresponds to the level of pneumatic braking. The pneumatic braking is provided through a pneumatic brake blending control valve that responds to variation of pneumatic pressure in a trainline pipe, and which further includes an electrical force motor that is interfaced with the pneumatic control of the control valve device to progressively counteract the pneumatic brake pressure, as the force motor control current is increased.

The electrical brake demand signal is compared electrically with a signal corresponding to the actual rate of train retardation, in order to provide a rate error signal only when the actual retardation rate exceeds the brake demand signal. This rate error signal provides the blending control valve force motor control current, so that the pneumatic brake pressure initially produced by operation of the operator's brake valve device is reduced, as the retardation rate of the train increases. In this manner, the normal delay experienced in development of the primary electrodynamic brake can be fully compensated by the pneumatic brake during the initial phase of the braking cycle, and can subsequently be released to the extent of the electrodynamic brake effectiveness as the electrodynamic brake develops. Moreover, the pneumatic control will make up for subsequent deficiencies that normally develop in the electrodynamic brake effectiveness as the train speed approaches zero, within the constraint of the brake demand signal.

Coupled with this basic closed-loop deceleration control system is a deceleration-limiting circuit, which includes a speed/adhesion function generator that outputs a maximum premissible retardation signal in parallel with the electric brake demand signal. This maximum permissible retardation signal, from the function generator, represents a limit that is imposed upon the electric brake demand signal by reason of the fact that a comparator device operates to establish the lower of either the brake demand signal or the maximum permissible retardation signal as the effective retardation rate demand. In addition, a slip modulating circuit is provided that further includes a wheel-slip detector and a staircase generator, which periodically modulate the output of the function generator by a predetermined percentage, so long as a wheel-slip condition exists during any given brake application.

BRIEF DESCRIPTION OF THE DRAWINGS

These and other objects and attendant advantages of the invention will become apparent from the following more detailed explanation, when taken with the accompanying drawings, in which:

FIG. 4 shows a staircase generator circuit which responds to a wheel-slip signal to generate the steps, in deceleration, to be subtracted from the maximum permissible retardation signal produced by the function generator;

FIG. 5 shows a summing circuit which performs the subtraction of the deceleration steps from the maximum permissible retardation signal; and FIG. 6 shows a decision-making circuit which selects, as the retardation rate demand signal, either the electric brake demand signal or the maximum permissible retardation signal, whichever is the lowest.

DESCRIPTION AND OPERATION

Figure 1:
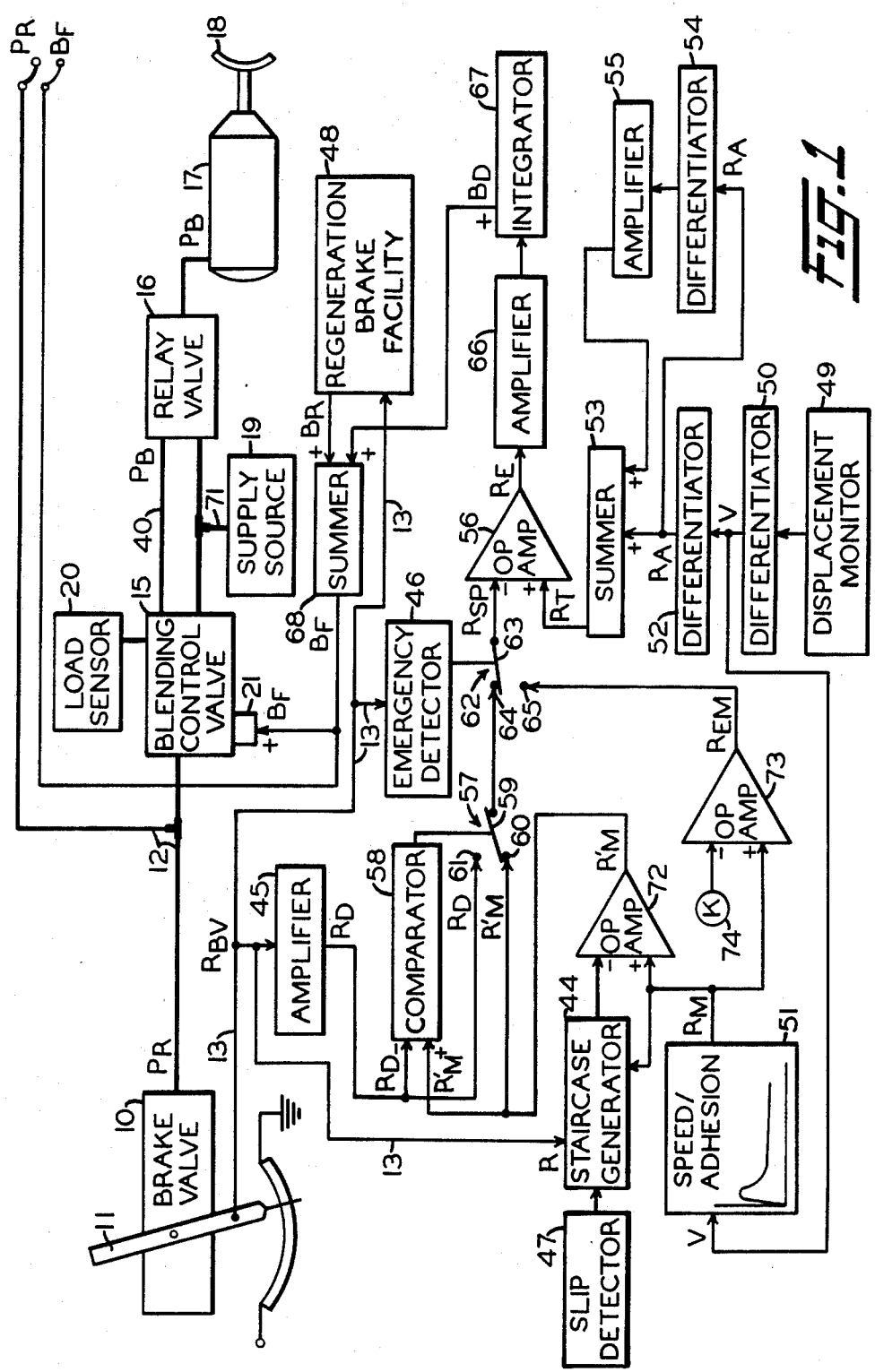
FIG. 1 shows a block diagrammatic of the deceleration control system of the present invention.

Referring now to FIG. 1, there is shown the deceleration control system of the present invention arranged on a cab car, that is, a railway car having operator controls. Cab cars are typically powered by traction motors that provide electrodynamic braking, as by dissipating the motive energy of the car or train, by using the traction motors to regenerate current to a power line via the car catenary for use by other cars or trains operating under propulsion.

A conventional operator's brake valve device 10, such as an SA-9 Brake Valve, manufactured by the Westinghouse Air Brake Company, includes a handle 11, by rotation of which the operator can vary the pressure $P_R$ of the compressed air carried in a pipe 12. With rotation of handle 11, a voltage is supplied to an electrical wire 13 via a rheostat 14, so as to vary from a minimum in brake-release position to a proportionally greater value in full-service brake application position. This rheostat voltage represents an electric brake demand signal $R_{BV}$, while the pressure in pipe 12 represents a pneumatic brake demand signal $P_R$ that also varies from a low pressure in brake-release position to a higher pressure in full-service brake application position concurrently with variation of the electrical brake demand signal. Pipe 12 may be connected through the train in order to transmit the pneumatic brake demand signal to the pneumatic brake equipment on each car of the train.

The pneumatic brake system is conventional, comprising a SERVOTROL type brake blending control valve device 15, a J-1 type relay valve device 16, and a pneumatic brake cylinder 17 to which is connected friction brake shoes or pads 18 for engagement with the vehicle wheel treads or discs (not shown). Also included in the pneumatic brake system is a source of air, such as a compressor and main reservoir, represented by block 19; and a load sensor, such as an air spring, represented by block 20.

Figure 2:
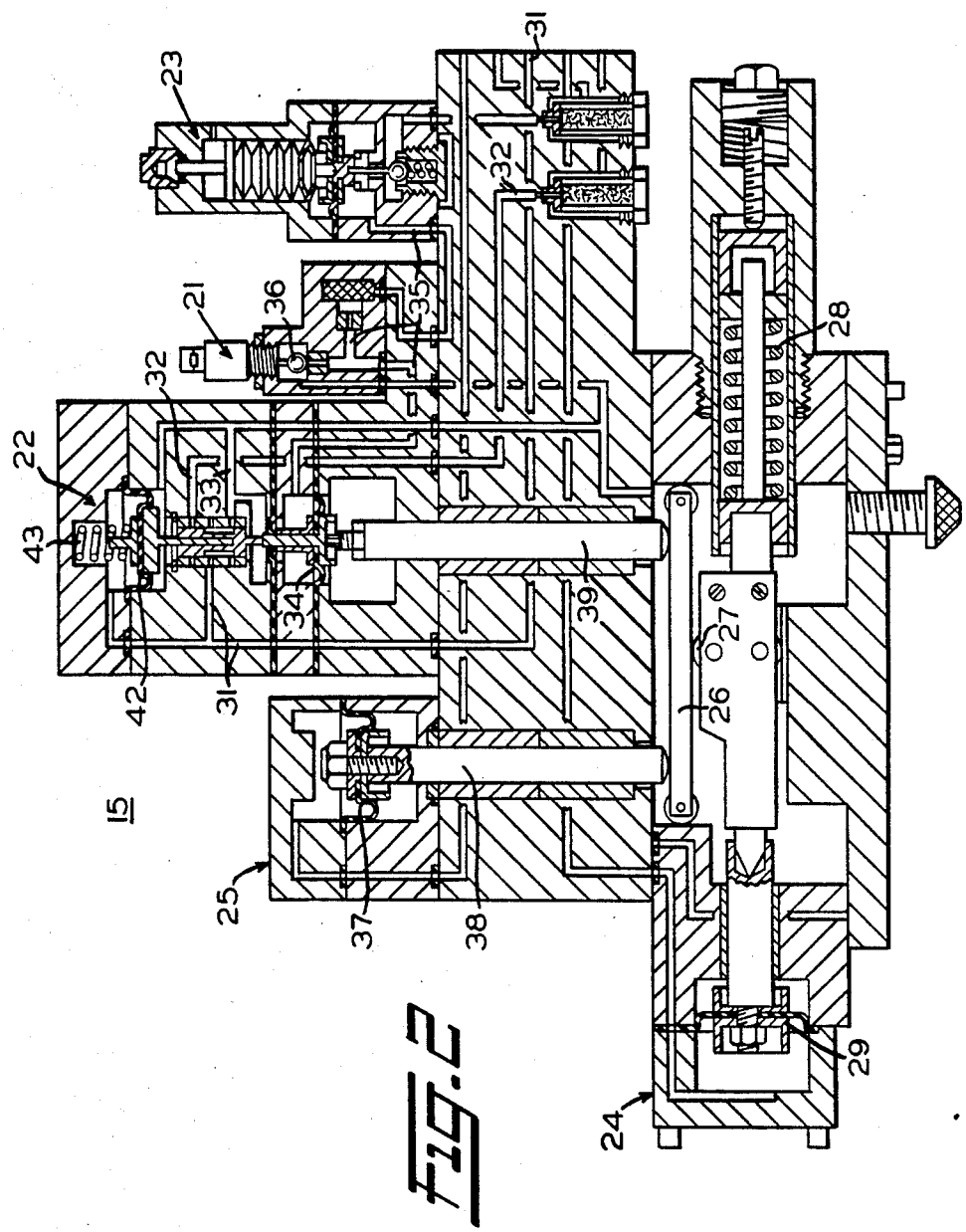
FIG. 2 shows a sectional diagrammatic of a SERVO-TROL type of valve used as the blending control valve.

Before briefly describing the pneumatic brake system operation, reference should be made to FIG. 2, showing details of a SERVOTROL type brake blending control valve 15 specifically suited to the arrangement of the present invention because of its brake-blending capability.

SERVOTROL brake blending control valve 15 comprises an electric-to-pneumatic transducer including a force motor 21, a self-lapping type relay valve 22, a pressure regulator 23, a load-responsive actuator 24, and a pneumatic brake actuator 25. The output force of actuator 25 is load-modulated through a balance beam 26, the fulcrum point of which is a movable roller 27 that is positioned in response to the counteracting forces of an adjustable spring 28 and a diaphragm piston 29 subject to the respective car air spring pressure, as represented by load sensor block 20. A delivery passage 31, a first supply passage 32, and an exhaust passage 33 are connected to the spool valve assembly of relay valve 22, which, in the neutral or lap position, blanks these passages. A diaphragm piston 34 is subject to pneumatic pressure supplied via a second supply passage 35 and a pressure regulator 23 to force the relay valve 22 in a downward direction to release position in which the relay valve spool valve assembly connects delivery passage 31 to exhaust passage 33, as shown. This pneumatic pressure supplied to diaphragm piston 34 is modulated by the force motor 21, so as to vary in direct proportion to current-changes effective thereat, as hereinafter discussed. As the force motor current increases, a bleed valve in the from of a ball valve 36, located in a vent branch of supply passage 35, is urged toward its seat to reduce the air bleed and thereby establish back pressure in passage 35 and at diaphragm piston 34 that increases as the force motor current increases. Conversely, a decrease in the force motor current allows this pressure under ball 36 to bleed off to atmosphere, thereby decreasing the back pressure in passage 35 and effective at diaphragm piston 34.

Pneumatic brake actuator 25 of brake blending unit 15 includes a diaphragm piston 37 subject to the output control pressure $P_R$ supplied by the operator's brake valve device 10 via pipe 12. Thus, rotation of handle 11 of brake valve device 10 from brake-release position to full-service position will concurrently cause the pressure $P_R$ in pipe 12 and current $R_{BV}$ in electric line 13 to increase from 0–50 psi. and from 0–500 ma., respectively. The pneumatic pressure effective at diaphragm piston 37 forces the diaphgram and its push rod 38 in a downward direction. This downward force tends to rotate balance beam 26 in a counterclockwise direction about its fulcrum roller 27 to urge a push rod 39, associated with the spool valve assembly of self-lapping relay valve 22, in an upward direction toward application position.

This upward force acting on self-lapping relay valve 22 is opposed by the force of pressure acting on diaphragm piston 34 under control of force motor 21, as previously discussed. It will, therefore, be appreciated that so long as the force motor current is of such value as to establish back pressure at diaphragm piston 34, sufficient to nullify the force exerted by the pneumatic brake actuator 25 through balance beam 26, the spool valve assembly of self-lapping relay valve 22 will remain in release position. However, if the current at force motor 21 is insufficient to maintain a counteracting pressure force at diaphragm piston 34, the spool valve assembly of self-lapping relay valve 22 will be shifted upwardly to application position, in which position the first supply valve passage 32 is connected to delivery passage 31. The resulting delivery pressure is connected via a pipe 40 to relay valve device 16 which, in turn, supplies compressed air from pressure source 19 to the pneumatic brake cylinder 17, thereby initiating friction braking at the respective car according to the delivery pressure at passage 31. Concurrently, pressure in delivery passage 31 is connected to a feedback diaphragm piston 42 that also acts on the self-lapping spool valve assembly in opposition to the effective upward-acting force exerted through balance beam 26. When these forces, including the force of small release spring 43, balance, the self-lapping spool valve assembly assumes its neutral or lap position in which further supply of delivery pressure is terminated. Consequently, the friction brake pneumatic pressure is determined by the pneumatic force exerted through brake actuator 25, as reduced by the pneumatic force exerted through control of relay valve 22 by force motor 21. As will be seen from the following discussion, as long as the level of electrodynamic braking is sufficient to satisfy the brake demand according to a given position of the brake valve handle 11, so that no supplemental friction brake is required, the force motor current will be sufficient to nullify the pneumatic force of brake actuator 25, thereby preventing the brake blending control valve 15 from developing any friction braking.

At the load-responsive actuator 24, pneumatic pressure from the car air spring 20 is connected to diaphragm piston 29 in order to position fulcrum roller 27 along balance beam 26 against the resistance of spring 28, thereby adjusting the lever ratio of balance beam 26 and thus the mechanical advantage with which the force motor current acts to counteract the pneumatic force of brake actuator 25.

Having now discussed the brake blending control valve 15 in the pneumatic brake portion of the present system, the following discussion will be directed toward the manner in which the control current signal of force motor 21 is generated via an electronic, deceleration-regulated control network.

The brake valve initiated electric brake demand signal $R_{BV}$ is connected from wire 13 to a reset input R of a staircase generator 44, an amplifier 45, an emergency detector 46, and a regenerative braking facility 48. The staircase generator is reset by a zero voltage signal, so that at the end of each braking cycle when the operator returns the brake valve handle 11 to release position, a zero voltage exists on wire 13 and staircase generator 44 is rest. Similarly, emergency detector 46 detects when the brake valve handle 11 is moved beyond full-service position to an emergency position; in which case, a voltage greater than the predetermined full-service brake voltage exists at wire 13.

In essence, the electronic, deceleration-regulated control network responds to an electric brake demand signal corresponding to a desired rate of retardation according to the position of the brake valve handle 11, determines the actual retardation rate of the train, and varies the friction brake effect only by decreasing the force exerted on brake shoes 18 to try and keep the train retardation rate at the requested rate. It may be, however that the braking effort required to give the requested retardation rate is greater than the adhesion between the wheels and rail will permit, and accordingly some or all of the wheels of the car may start slipping. Such slip is detected by a slip detector 47, such as a conventional E-5 DECELOSTAT, manufactured by the Westinghouse Air Brake Company, which then causes the braking effort to be decreased until the wheel-slip has disappeared and effective braking again takes place. Further, as the car also has a regenerative braking facility 48, the force exerted on the brake shoes 18 is controlled so that the sum of regenerative and frictional braking gives the greatest possible retardation rate within the constraints of the system.

The electronic, deceleration-regulated control network also includes a displacement monitor 49, which monitors the distance that the car has travelled. This may conveniently be effected by monitoring the angle through which the wheels of the car have rotated and, knowing the circumference of the wheels, the displacement can then be determined therefrom. A signal supplied by the displacement monitor 49 is differentiated by a differentiator 50 to supply a speed signal V which is supplied to a function generator 51 and to a further differentiator 52, which provides a signal $R_A$ representative of the actual deceleration that the car is experiencing. While the various differentiator blocks 50 and 52, as well as displacement monitor block 49, are shown to demonstrate how the train speed and rate signals are obtained; it should be noted that the E-5 DECELOSTAT, used as slip detector 47, includes such circuitry from which outputs can be taken to obtain these speed and rate signals. Function generator 51 exhibits a certain speed/adhesion characteristic that shows varying adhesion values at different speeds and accordingly provides a signal $R_M$ representative of the maximum retardation rate at which the car can normally be decelerated from a given speed without causing the wheels to slip. As can be seen from the curve profile of function generator 51, the maximum adhesion value between a wheel and rail increases as the speed decreases. The profile provides a roll-off characteristic at near zero speed to minimize jerking of the car as it comes to a standstill.

The actual rate of retardation signal $R_A$ is supplied to a summer 53, and also a further differentiator 54 which supplies an anticipatory signal to the summer via an amplifier 55. Thus, the summer is supplied with a signal $R_A$ representative of the actual rate of retardation of the train and a further signal that reflects the rate at which the train deceleration is changing. By utilizing an anticipatory signal in the control loop, the stability of the system is improved and the rate at which the car decelerates at high levels of deceleration is minimized, thereby increasing the comfort of passengers in the car.

The summer 53 provides a signal $R_T$ which is supplied to the positive input of an operational amplifier 56.

In normal operation, a set point signal $R_{SP}$ that is supplied to the negative input of the operational amplifier 56 is a desired rate of retardation signal $R_D$ supplied by the amplifier 45 via a single-pole, double-throw relay 57. The relay 57 is controlled by a comparator 58 having a contactor 59 which is displaced by the relay to engage either a contact 60 or a contact 61. The contactor 59 normally engages the contact 60 in the absence of a signal from the comparator 56 to energize relay 57.

The electronic, deceleration-regulated control network also has a emergency relay 62 which is a single-pole, double-throw relay that is controlled by emergency detector 46. Thus, the relay 62 has a contactor 63 which is displaced by operation of the relay to engage either a contact 64 or a contact 65. The contactor 63 normally engages the contact 64. The operation of comparator 58 and emergency detector 46 are discussed hereinafter.

The operational amplifier 56 provides an error signal $R_E$ which is amplified by an amplifier 66, integrated by an integrator 67 (which is only allowed to provide a positive output signal), and the integrated signal $B_D$ is supplied to a summer 68. The summer 68 is also supplied with a feedback signal $B_R$ from the regenerative braking facility 48 which is representative of the amount of electrodynamic braking provided. This feedback signal $B_R$, however, is normally isolated from summer 68 and is only connected thereto as a back-up feedback loop, in the event a fault-condition arises to prevent the positive polarity error signal $B_D$ from being generated. In such event, the system changes from a pure rate or deceleration-regulated control system to a non-rate regulated system. The summer 68 then provides a current signal $B_F$ to force motor 21 of brake blending control valve 15. In addition, this signal $B_F$ is connected through each car of a train set in order to modulate the friction brake effect on these trailing cars, as well as on the cab car.

The blending control valve 15 supplies a pneumatic pilot pressure to relay valve 16 via pneumatic line 40, and the relay valve in turn operates to supply output fluid pressure via a pneumatic line 70 to the brake cylinder 17. A pneumatic line 71 connects compressed air from pressure source 19 to the relay valve 16 and the blending control valve 15. As previously mentioned, the blending control valve 15 is supplied with a pneumatic signal indicative of the vehicle load condition from load sensor 20, which may be, for example, air springs for the car.

It will be appreciated that the pneumatic output pressure in line 40 is amplified by the relay valve 16 in terms of providing the high capacity required to operate the brake cylinder 17. The blending control valve 15 operates in a directly proportional manner. Thus, maximum pressure in pipe 12 results in maximum pressure in lines 40 and 70 to provide maximum braking effort.

Thus, the pneumatic brake demand signal $P_R$, provided by brake valve 10 via the pneumatic pipe 12, is modified by the blending control valve in response to the pneumatic signal supplied by the load sensor 20, and by the electrical signal $B_F$ supplied by summer 74 to force motor 21 to provide a modulated pressure $P_B$ at the blending valve output. It will further be appreciated that the electrical signal $B_F$, supplied by the summer 74, can only act to decrease the pressure $P_B$ from what it would be if there were no electrical signal $B_F$ effective at the blending control valve force motor 21. Further, the greater the signal $B_F$, the greater the decrease in the pneumatic pressure $P_B$ in lines 40 and 70. Thus, if the force motor control signal $B_F$ increases, then the pneumatic signal $P_B$ decreases, and vice versa. There can be no increase in the friction brake effort in excess of the level requested in accordance with the selected position of brake valve handle 11. For example, if brake valve handle 11 is moved to a position corresponding to half of a full-service brake, and the regenerative braking facility 48 is providing some degree of electrodynamic braking, then obviously the actual train deceleration will be too great, due to the additional retardation from the friction brake, in response to the pneumatic brake demand signal $P_R$ acting through blending valve 15. The actual deceleration signal $R_A$ and thus signal $R_T$ at operational amplifier 56 will thus exceed the signal $R_{SP}$ thereat, corresponding to the brake demand as modified by a deceleration-limiting network hereinafter explained. The resultant rate error signal $R_E$ at the output of operational amplifier 56 will, in this case, be some positive value, depending upon the difference between the retardation rate demand and actual retardation rates. Similarly, the output $B_F$ of summer 68 will follow this error signal $R_E$ to cause force motor 21 to reduce the pneumatic pressure at lines 40 and 70 and thereby reduce the friction brake effort accordingly. If the electrodynamic brake effort provided by the regenerative braking facility 48 is capable of fully satisfying the brake demand, signal $B_F$ will be maximum, thereby causing force motor 21 to completely hold off the pneumatic brake effect requested by the pressure $P_R$ at pipe 12; so that the friction brake will be fully released and only the electrodynamic brake will be effective. If the electrodynamic brake effort is only capable of providing a portion of the brake demand, signal $B_F$ will be some positive value less than maximum, and the force motor 21 will partially hold off the pneumatic brake a corresponding amount, so that the train deceleration according to the called-for brake demand will be provided by a combination of electrodynamic and friction brake effort.

It will be appreciated from the foregoing that the level of pneumatic braking achieved by blending control valve 15 operating through relay valve 16, and the size of pneumatic cylinder 17, are such that under normal circumstances, and taking into account such expected variables as rolling resistance, track grade, etc., sufficient friction brake force is attainable to provide train deceleration at a predetermined maximum allowable rate. Thus, amplifier 66 only passes the deceleration error signal $R_E$ to summer 68 via integrator 67 when the error signal $R_E$ is positive polarity, since negative polarity error signals $R_E$ only arise in the unlikely case of the actual retardation rate $R_A$ being less than the desired deceleration according to the brake demand, and for which unlikely case the system is not intended to respond.

It will be further appreciated by persons knowledgeable in control theory that a proportional—integral—differential control loop is provided by means of amplifier 66, integrator 67, and differentiator 54 to anticipate the rate at which the actual rate of deceleration $R_A$ is changing in order to improve system stability.

The system 10 not only provides closed-loop control to implement controlled deceleration, it also monitors wheel-slip and varies the control parameters to obtain optimal braking. This is obtained by means of the function generator 51, which is utilized to provide a different set point deceleration signal from that provided by the operator.

It will be understood that if the total braking effort being applied is greater than can be supported by the degree of adhesion currently obtainable between the wheels and the rail, the total braking effort must be decreased until slip disappears. Thus, a suitable speed/adhesion profile is provided by function generator 51, either by computation or by experimentation, so as to obtain at the output of generator 51, a signal $R_M$ which is representative of the maximum rate of vehicle retardation permitted at a particular speed, in order to minimize the opportunity of a wheel-slip. The signal $R_M$ is supplied to the positive input of an operational amplifier 72 and to the positive input of an operational amplifier 73. The output of staircase generator 44 is supplied to the negative input of the operational amplifier 72, and a constant value signal is supplied to the negative input of the operational amplifier 73 from a suitable source 74. The output of the operational amplifier 72 is a modified maximum permissible retardation signal $R'_M$. This signal $R'_M$ is applied to the positive input of the comparator 58 and to contact 60. The desired retardation signal $R_D$ is supplied from amplifier 45 to the negative input of comparator 58. If the desired retardation signal $R_D$ is less than the modified maximum permissible signal $R'_M$, then the comparator 58 operates relay 57 to displace the contactor 59 from its normal position into engagement with the contact 61, so that the desired retardation signal $R_D$ is supplied to the operational amplifier 56 as the set point signal $R_{SP}$. However, if the desired retardation $R_D$ is greater than the modified maximum permissible value $R'_M$, then the comparator 58 is operated to deenergize relay 57 and the value $R'_M$ is supplied to the operational amplifier 56 as the set point value. Thus, if the operator attempts to obtain a greater deceleration, under normal operation conditions, than the modified maximum permitted, then the system will not try to decelerate the car at the value requested by the operator, but at the modified maximum provided for by the operational amplifier 72.

If the wheels of the car are slipping, then this is detected by the slip detector 47, which causes the staircase generator 44 to increase its output signal, which then subtracts from the maximum retardation signal $R_M$ produced by function generator 51 to provide a modulated or reduced maximum permissible retardation signal $R'_M$, which is then utilized. If slip continues, then after a predetermined period of time, the output of the staircase generator 44 increases further to further decrease the signal $R'_M$. When $R'_M$ is greater than $R_D$, the set point signal is $R_D$. However, when $R'_M$ becomes smaller than $R_D$, then the comparator 58 switches the relay 57 and $R'_M$ becomes the set point signal. If slip still continues, then $R'_M$ is decreased further, and the frictional braking is reduced until such time as there is no slip. As the speed of the car decreases, the value of $R_M$ will increase in accordance with the speed/adhesion profile, thereby giving optimal braking. It can occur, under normal operating conditions, that as the speed of the car decreases, the value of $R'_M$ could increase to be greater than $R_D$. When this happens, it is detected by the comparator 58, which switches the relay 57 so that the set point value is once again $R_D$. As the speed of the train approaches zero, the roll-off part of the characteristic in the speed/adhesion profile provided by function generator 51 comes into effect and the set point signal becomes $R'_M$, which progressively decreases to zero as the train set slows down, with braking effort being decreased, to minimize the jerk that would otherwise take place when the train set reaches a standstill.

Under emergency braking conditions, the emergency detector 46 switches its relay 62, so that the set point signal becomes $R_{EM}$, that is, the retardation signal provided by the operational amplfier 73. The signal $R_{EM}$ is the maximum retardation $R_M$, less the constant voltage signal k from supply 74, to ensure that there is still brake effort under worst-case conditions of wheel slip. Alternatively, the constant value may give adhesion under the best conditions, and the maximum signal may then be decremented if slip occurs, as discussed above.

Figure 3:
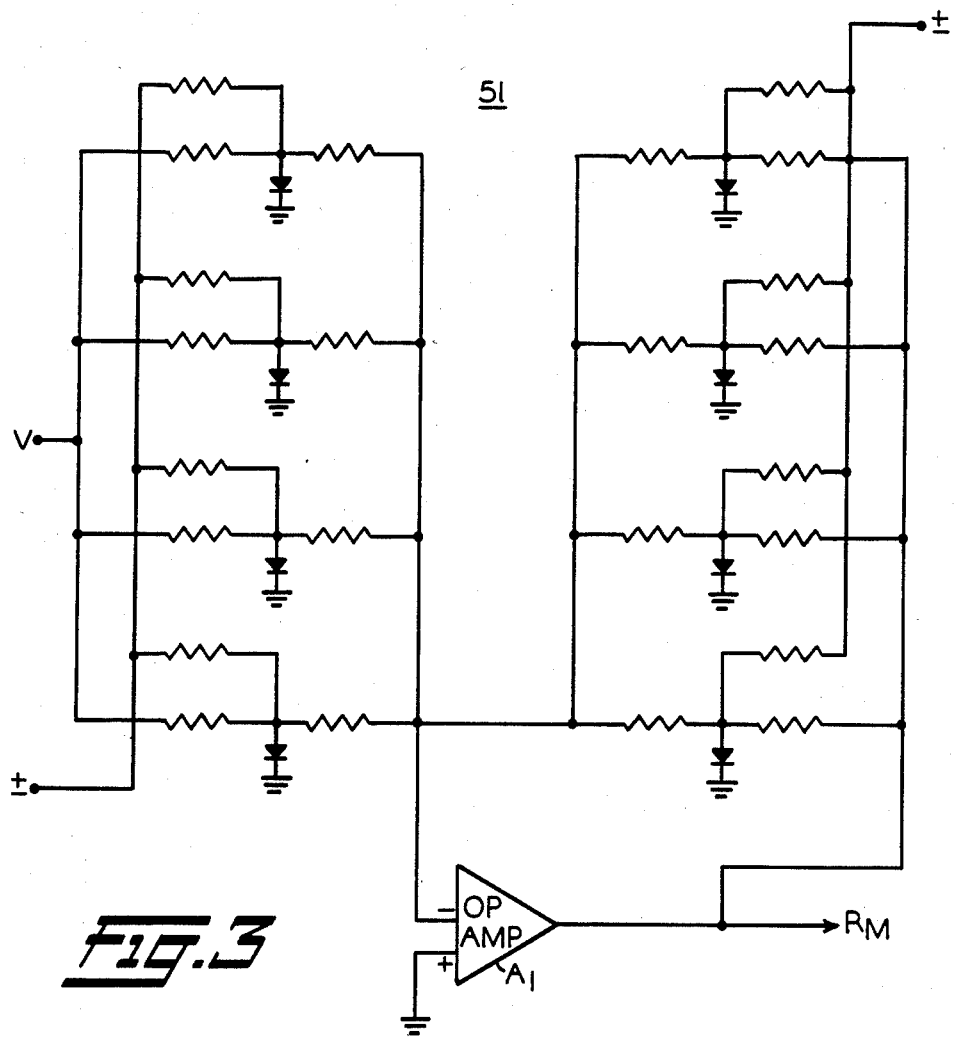
FIG. 3 shows a function generator circuit that provides a speed/adhesion profile from the train speed in accordance with known variances in wheel rail adhesion values under different conditions of train speed.

Referring now to FIG. 3, there is shown circuitry providing function generator 51 in the form of a conventional, non-linear, resistor-diode network in the forward, as well as the feedback circuits of an operational amplifier $A_1$, for generating the required non-linear relationship between the speed signal V at the input of the function generator 51 and the output $R_M$. By selecting appropriate values of the various resistors and diodes, the output of amplifier A will provide the maximum permissible deceleration signal $R_M$ as a function of the speed/adhesion curve for different speeds.

In FIG. 4, there is shown the staircase generator 44 in the form of a step-accumulator circuit that incorporates a programmable gain amplifier $A_2$ having an input to which the maximum permissible deceleration signal $R_M$ is connected from the output of amplifier $A_1$ in the function generator circuit of FIG. 2, and a counter that is triggered by a slip signal from the slip detector 47. The output of amplifier $A_2$ provides a decrement signal $R_S$ in steps, as long as the counter remains triggered by the presence of a slip signal. The decrement signal $R_S$ changes, by a different predetermined value, each count-period of the counter. A reset input of the counter is enabled by a signal from rheostat 14 when the brake valve handle 11 is moved to release position, following a brake application cycle.

In FIG. 5, there is shown the operational amplifier 72 comprising a negative gain amplifier $A_3$ to which is connected at the negative input thereof, the decrement signal $R_S$ and a gain amplifier $A_4$ having connected at the negative input thereof, the voltage difference between the decrement signal $R_S$ of amplifier $A_3$ and the maximum permissible rate of retardation signal $R_M$. The output of amplifier $A_4$ thus emits an output signal $R'_M$ that is the maximum permissible deceleration signal $R_M$ reduced by the effective decrement signal $R_S$.

In FIG. 6, there is shown comparator 58 comprising an amplifier $A_5$, the output of which is connected to the base terminal of a transistor T1 having a winding of relay 57 in its emitter/collector path. Contactor 59 of relay 57 is controlled by the relay winding, so as to engage contact 61 when the relay winding is energized, and to engage contact 60 when the relay winding is deenergized. Contact 61 is connected to the brake-value-initiated electric brake demand signal $R_{BV}$, and contact 60 is connected to the decremented maximum permissible deceleration signal $R'_M$. The output of amplifier $A_5$ is polarity-sensitive, according to whether the $R'_M$ signal or the $R_{BV}$ signal is lower, in order to turn ON and OFF transistor T1 accordingly. The transistor, in turn, controls relay 57 to output the lower of either signal $R'_M$ or $R_{BV}$.

It will be understood that the staircase generator 44 can be modified so that, at the beginning of a braking cycle, its output is increased to a suitable value such that initially $R'_M = R_D$. This will minimize the delay before braking effort is decreased to avoid slip.

It will also be appreciated that at least a part of the control loop may be implemented digitally rather than in an analogue manner, as shown in the drawing. Thus, a central processing unit that is suitably programmed could be utilized to effect differentiation and other functions digitally. Similarly, instead of using physical switches, such as relays 57 or 62, a logic-switching process could be utilized.

Also, a conventional 26 or 28 type brake valve, manufactured by the Westinghouse Air Brake Company, could be used in place of the SA-9 type brake valve. Since these types of brake valves operate on the inverse principle, that is, a reduction in pressure with handle movement from release to full-service position; a pressure inverter, such as a conventional MC-30 control valve, also manufactured by the Westinghouse Air Brake Company, must be used in pipe 12.

As an alternative to a pressure inverter in pipe 12, when employing a 26 or 28 type brake valve, a different version SERVOTROL blending valve 15 could be used, wherein the pneumatic actuator 24 is modified by arranging a spring to actuate the balance beam via a piston subject to the pressure in pipe 12 acting in opposition to the spring.

I claim:
1. A brake control system for a wheeled railway vehicle comprising:
 (a) means for concurrently providing a pneumatic brake demand signal and a corresponding electric brake demand signal;

(b) control valve means for effecting friction brake effort on said vehicle in response to said pneumatic brake demand signal;

(c) limit means for providing a maximum permissible rate of retardation signal;

(d) means for providing a retardation rate demand signal according to the lesser of said electric brake demand signal and said maximum permissible rate of retardation signal;

(e) means for providing a rate feedback signal according to the actual rate of retardation of said vehicle;

(f) means for providing a rate error signal in accordance with the difference between said retardation rate demand signal and said rate feedback signal; and (g) said control valve means including means responsive to said rate error signal for counteracting said pneumatic brake demand signal such as to modulate said friction brake effort.

2. A brake control system, as recited in claim 1, wherein said means for counteracting said pneumatic brake demand signal is an electric-to-pneumatic transducer.

3. A brake control system, as recited in claim 1, wherein said means for providing said pneumatic and electric brake demand signals is an operator-controlled brake valve device having a handle by which said pneumatic and electric brake demand signals are varied between predetermined lower and upper values, in accordance with the selected position of said handle between brake-release and full-service brake application positions.

4. A brake control system, as recited in claim 1, further comprising:

(a) means for providing a speed signal according to the speed of movement of said vehicle; and (b) said limit means being a function generator having a predetermined speed/adhesion characteristic from which said maximum permissible rate of retardation signal is generated at different speeds of said vehicle.

5. A brake control system, as recited in claim 4, wherein said means for providing said retardation rate demand signal comprises:

(a) switch means having a normally-open contact to which said electric brake demand signal is connected and a normally-closed contact with which said maximum permissible rate of retardation signal is connected; and (b) comparator means having a first input subject to said electric brake demand signal, a second input subject to said maximum permissible rate of retardation signal, and an output via which said switch means is energized when said electric brake demand signal is less than said maximum permissible rate of retardation signal, and deenergized when said maximum permissible rate of retardation is less than said electric brake demand signal.

6. A brake control system, as recited in claim 1, further comprising:

(a) means for detecting a wheel-slip condition; and (b) slip modulating means for reducing said maximum permissible rate of retardation signal during said wheel-slip condition.

7. A brake control system, as recited in claim 6, wherein said slip modulating means comprises:

(a) means for providing a slip signal when any wheel of said vehicle is slipping; and (b) staircase generator means for providing a decrement signal in response to the presence of said slip signal by which said maximum permissible rate of retardation signal is reduced.

8. A brake control system, as recited in claim 7, wherein said decrement signal has a value such that said maximum permissible rate of retardation signal is reduced by a predetermined percentage.

9. A brake control system, as recited in claim 8, wherein said decrement signal is present for a predetermined time duration and is periodically repeated during the presence of said slip signal.

10. A brake control system, as recited in claim 9, wherein the value of said decrement signal is varied during each said predetermined time duration such that said maximum permissible rate of retardation signal is reduced periodically by said predetermined percentage.

11. A brake control system, as recited in claim 7, wherein said staircase generator means is resettable in response to said electric brake demand signal being a predetermined value.

12. A brake control system, as recited in claim 7, further comprising:

(a) means for detecting an emergency brake application; and (b) emergency modulating means for providing said retardation rate demand signal during an emergency brake application in bypass of said slip modulating means.

13. A brake control system, as recited in claim 1, further comprising means for connecting said rate error signal to said counteracting means only when said rate error signal has a predetermined polarity indicative of said rate feedback signal exceeding said retardation rate demand signal.

14. A brake control system, as recited in claim 13, wherein said error signal acts on said counteracting means in such sense as to decrease said friction brake effort.

15. A brake control system, as recited in claim 14, further comprising:

(a) an operational amplifier having a first imput subject to said retardation rate demand signal, a second input subject to said rate feedback signal, and an output providing said rate error signal; and (b) means acting on said rate feedback signal for providing an anticipatory signal to modify said rate feedback signal according to the rate of change of said rate feedback signal.

16. A brake control system, as recited in claim 13, further comprising electrodynamic brake means for providing regenerative braking of said vehicle in accordance with said electric brake demand signal.

17. A brake control system, as recited in claim 16, further comprising means for connecting a regenerative brake feedback signal to said counteracting means in bypass of said rate error signal in the event the polarity of said rate error signal is opposite said predetermined polarity.

18. A brake control system, as recited in claim 4, wherein said predetermined speed/adhesion characteristic exhibits a roll-off profile during a time period in which said speed signal approaches zero just prior to standstill, whereby said maximum permissible rate of retardation signal is reduced at a faster rate during said time period than prior to said time period.

* * * * *